UNITED STATES PATENT OFFICE.

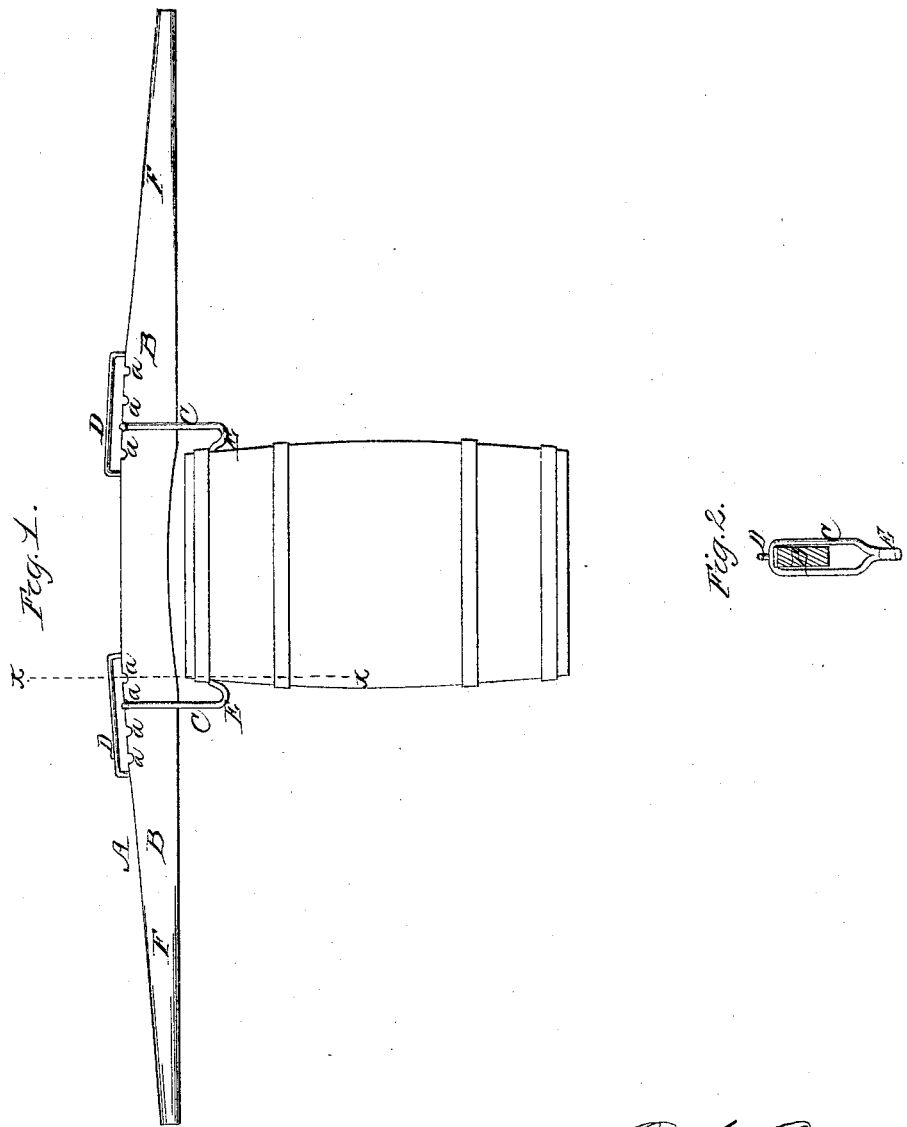

LUCIUS H. GOFF, OF ST. ALBANS, VERMONT, ASSIGNOR TO THOMAS C. WINSLOW, OF SAME PLACE.

IMPROVEMENT IN BARREL-LIFTERS.

Specification forming part of Letters Patent No. 57,819, dated September 4, 1866.

*To all whom it may concern:*

Be it known that I, LUCIUS H. GOFF, of St. Albans, in the county of Franklin and State of Vermont, have invented a new and Improved Implement or Device for Lifting Flour and other Barrels; and I do hereby declare that the following is a full, clear, and exact description thereof, which will enable others skilled in the art to make and use the same.

This present invention relates to a novel and useful implement to be used for the lifting of flour and other barrels, whereby it can be accomplished with great convenience and in a most ready and comparatively easy manner, the implement being adjustable to the varying sizes of the heads of barrels, as will be obvious from the following detail description thereof, reference being had to the acompanying plate of drawings, in which—

Figure 1 is a side view of the barrel-lifter embraced in the present invention, showing it as applied to a barrel; and Fig. 2, a transverse vertical section taken in the plane of the line *x x*, Fig. 1.

A, in the drawings, represents the lifter, which is formed of a straight bar or lever, B, having two hooks, C C, hung upon it, and moving under clasps or guide-bands D D secured to the upper edge of the bar, which hooks, by their eyes embracing the bar, are set in notches *a a* of the same according as the head of the barrel, to which they are to be applied by their hook ends E, is greater or smaller in diameter. These hook ends are inserted under and engaged with the hooks upon one end of the barrel, as plainly illustrated in Fig. 1.

The outer ends or portions, F, of the lever or bar are rounded off, so as to form suitable handles to receive the hands for grasping it when the barrel with which it has been engaged through its hooks is to be lifted.

By means of the barrel-lifter hereinabove described it is plainly apparent that it can be accomplished with comparative freedom and ease, and with but little, if any, inconvenience—advantages of the utmost importance.

What I claim as new, and desire to secure by Letters Patent, is—

The barrel-lifter herein described, the same consisting of a notched bar or lever, B, having hooks C C hung upon it, and moving under bands D, or their equivalents, substantially as herein described, and for the purpose specified.

The above specification of my invention signed by me this 31st day of March, 1866.

LUCIUS H. GOFF.

Witnesses:
THOS. C. WINSLOW,
A. O. BRAINEN.